United States Patent [19]

Logan et al.

[11] Patent Number: 4,489,852
[45] Date of Patent: Dec. 25, 1984

[54] INSULATED COOKING UTENSIL

[76] Inventors: Eugene T. Logan, 2404 Parkwood Cir., Claremore, Okla. 74017; Richard A. Barlow, 949 Marymount Rd., Salina, Kans. 67401

[21] Appl. No.: 425,435

[22] Filed: Sep. 28, 1982

[51] Int. Cl.³ .............................................. B65D 25/18
[52] U.S. Cl. .................................... 220/469; 220/447; 220/68
[58] Field of Search ............ 220/469, 68, 23.2, 23.86, 220/21, 70, 445, 23.83, 72, 447; 229/2.5

[56] References Cited

U.S. PATENT DOCUMENTS

| | | | |
|---|---|---|---|
| 1,093,648 | 4/1914 | Potter | 220/469 |
| 1,361,364 | 12/1920 | Burlingham | 220/447 X |
| 1,749,433 | 3/1930 | Kussa et al. | 220/469 X |
| 2,151,535 | 3/1939 | Scurlock | 220/68 X |
| 2,771,754 | 11/1956 | Winkler | 220/469 X |
| 2,938,645 | 5/1960 | McCowan | 220/23.86 X |
| 3,934,748 | 1/1976 | Racz | 220/68 X |

Primary Examiner—Steven M. Pollard
Attorney, Agent, or Firm—Head, Johnson & Stevenson

[57] ABSTRACT

Insulated cooking utensils comprising inner and outer cooking surfaces having an air chamber interposed therebetween for isolating or insulating the inner cooking surface from direct heat application during a cooking operation, a plurality of support members interposed between the inner and outer cooking surfaces for securely retaining the spaced relationship therebetween for assuring an efficient insulation afforded by the air chamber.

2 Claims, 7 Drawing Figures

INSULATED COOKING UTENSIL

BACKGROUND OF THE INVENTION

1. Field of the Invention

This invention relates to improvements in cookware, and more particularly, but not by way of limitation, to insulated cookware for reducing inadvertent overcooking of food.

2. Description of the Prior Art

In the preparation of many foods the cooking time is often quite critical and overcooking may be very detrimental to the final quality of the cooked food. This problem is particularly prevalent in the baking of foods in an oven, or the like, wherein overbaking may substantially ruin the food. For example, cookies will burn relatively quickly if permitted to stay in the oven longer than the prescribed time, although they may also be underdone if removed from the oven prematurely. Furthermore all ovens do not cook "the same" since some ovens are apparently "hotter" than other ovens even though the temperature control for the oven may be at the same setting as another oven. As a result, there is sometimes very little tolerance in the baking time for many foods.

Cooking utensils have been developed for improving or facilitating the cooking of foods such as those shown in the Braddick U.S. Pat. No. 1,324,297 issued Dec. 9, 1919 and entitled "Pie and Cake Baker". This patent shows a cake and pie baker particularly designed for reducing the amount of heat required for baking of these foods. The Darley U.S. Pat. No. 1,505,703, issued Aug. 19, 1924 and entitled "Heating Utensil" discloses a double walled vessel having a heat transmitting medium interposed between the walls thereof. The Fassett U.S. Pat. No. 1,569,734 issued Jan. 12, 1926 and entitled "Insulated Vessel Cooking, Holding, and Serving Foods" relates to a vessel designed for holding a cooking temperature for an extended time period to reduce the amount of heat required during the cooking operation and for keeping the cooked food warm for an extended time period to facilitate the serving thereof. The Kussa et al U.S. Pat. No. 1,749,433 issued Mar. 4, 1903 and entitled "Baking Pan and Method of Baking" shows a baking pan particularly designed for baking of two loaves of bread simultaneously or in a common pan, and particularly being constructed whereby the portion thereof coming into contact with the bread dough is insulated from the portion that is subjected to the direct heat, thus preventing the forming of a tough crust on the bottom and sides of the bread. The Hofstetter U.S. Pat. No. 4,296,728 issued Oct. 27, 1981 and entitled "Energy Saving Pots, Pans and Adapter" discloses a cooking vessel including an L-shaped heat shield extending around the outer periphery thereof.

In addition, an insulated cooking sheet was developed in the past to alleviate or at least reduce the critical baking time in the cookie baking procedures. This insulated cooking sheet comprised a double walled planar body having asbestos interposed between the walls thereof for reducing the temperature of the cooking surface of the cookie sheet to lessen the danger of overbaking or burning the bottom of the cookies. Of course, in recent times the use of asbestos has been greatly curtailed and it is certainly not desirable to use asbestos in connection with cooking utensils, so the asbestos insulated cooking sheet is no longer a viable solution to the problem.

SUMMARY OF THE INVENTION

The present invention contemplates cooking utensils particularly designed and constructed for overcoming the foregoing disadvantages and comprises a cookware of a double walled construction providing an insulating layer or volume of air therebetween for isolating the cooking surface from the direct heat of the oven or the like. In addition, a plurality of spaced support means are provided between the walls of the cookware for assuring the spaced relationship of the walls thereof in order to improve the efficiency and long useful life of the vessels or utensils. For example, a cookie sheet of the present invention comprises a double walled relatively large planar construction providing a layer of insulating air between the layers whereby the cooking surface of the cookie sheet is isolated from the direct heat of the oven wherein the cookie sheet is disposed during the baking operation. The inherent nature of a large planar cooking surface is such that portions of the planar surface frequently sag or deviate from the essentially planar configuration and in order to substantially eliminate this problem the present invention provides a plurality of spaced support means interposed between the walls of the cookie sheet. In this manner the insulating properties of the layer of air between the walls of the cookie sheet is not diminished but the retention of an essentially planar configuration for the baking surface of the cookie sheet is retained. Thus, a cookie sheet which is simple and efficient in use and of economical and durable construction is provided.

DETAILED DESCRIPTION OF THE PREFERRED EMBODIMENT

Figure 2:
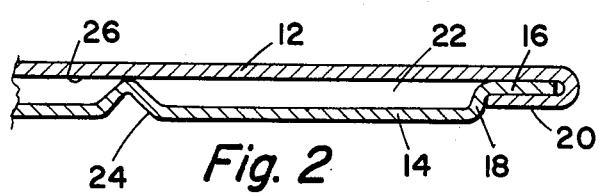
FIG. 2 is a view taken on line 2—2 of FIG. 1.

Referring to the drawings in detail, reference character 10 generally indicate a cookie sheet comprising an upper wall 12 of a relatively large rectangular planar configuration and a lower wall 14 in spaced and mutually parallel relation with respect thereto. The outer periphery of the lower wall 14 is provided with an outwardly extending flange 16 which is offset with respect to the planar configuration of the wall 14 as particularly shown at 18 in FIG. 2. The outer periphery of the upper wall 12 is provided with a crimped or reversed turned flange 20 spaced with respect to the planar configuration of the wall 12 for receiving the flange 16 therebetween thus securely retaining the walls 12 and 14 together in spaced relationship providing a chamber 22 therebetween. The air pocket in the chamber 22 provides insulation between the lower wall 14 and upper wall 12.

The lower wall 14 is provided with a plurality of spaced detents 24 each detent 24 extending into engagement with the inner surface 26 of the wall 12. In this manner the wall 12 is supported from the wall 14 in a manner substantially assuring retaining of the planar configuration of the wall 12 during use of the cookie sheet 10. It will be readily apparent that the detents 24 in no manner interfere with the air pockets 22 interposed between the walls 12 and 14.

It will be apparent that the cookie sheet 10 may be of a planar rectangular configuration and may be provided with upstanding sidewalls (not shown) around the outer periphery thereof if desired. As shown herein, one short edge 28 of the cookie sheet 10 is provided with an angularly outwardly extending flange portion 30 providing a convenient handle or gripping means for facilitating use of the sheet 10 during a baking or other cooking operation. In use, the cookie sheet 10 may be placed on any suitable shelf (not shown) in an oven or the like (not shown) in the usual manner for baking substantially any desired food product thereon. Of course, it will be readily apparent that a plurality of unbaked cookies may be placed on the outer surface of the wall 12 in properly spaced relationship with respect to one another and the cookie sheet may be positioned in the oven for the desired baking of the cookies carried thereby. The wall 14 of the cookie sheet 10 will be subjected to the direct heat of the shelf upon which the cookie sheet 10 is resting and the surface 12 will be insulated from this direct heat by the air pockets 22 between the walls 12 and 14. Thus, the bottom of the cookies will be protected from becoming too brown or burned during the normal cooking operation. This also substantially eases the critical nature of the baking time of the cookies being prepared on the cookie sheet 10.

Figure 3:
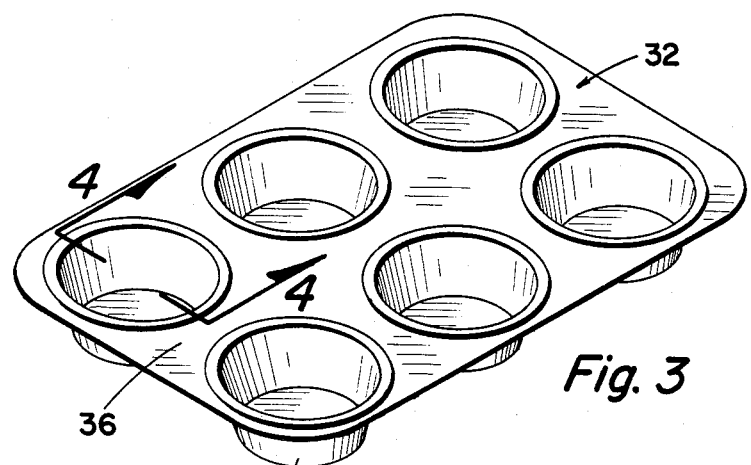
FIG. 3 is a perspective view of a muffin tin embodying the invention.
Figure 4:
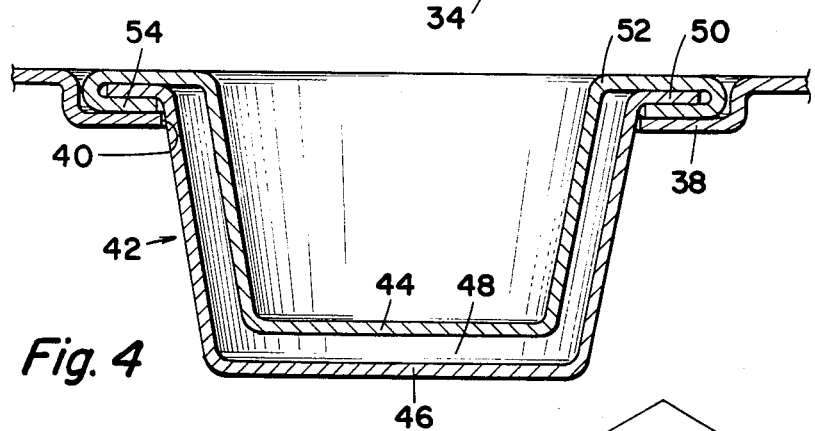
FIG. 4 is an enlarged sectional view taken on line 4—4 of FIG. 3.
Figure 1:
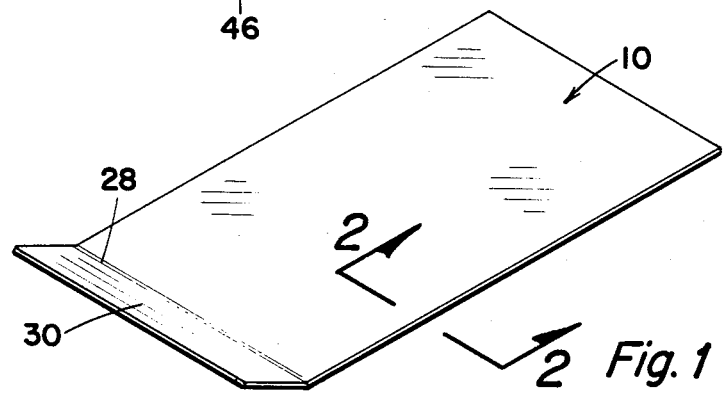
FIG. 1 a perspective view of a cookie sheet embodying the invention.

Referring now to FIGS. 3 and 4, a muffin tin is generally indicated by reference numeral 32 and comprises the usual plurality of spaced recesses or baking cup portions 34 connected together by a common planar sheet 36 in the usual or well known manner. The sheet 36 is provided with a plurality of recessed shoulder members 38 as shown in FIG. 4 and each shoulder member 38 is provided with a central aperture 40 thus providing a plurality of spaced openings in the sheet 36. An insulated cup member 42 is disposed in each of the recesses 38 and extends through the aperture 40 as particularly shown in FIG. 4. The insulated cup structure 42 comprises an inner open housing 44 surrounded by a correspondingly configured outer housing 46 arranged concentric therewith and in spaced relationship thereto. The spaced relationship between the inner and outer housings 44 and 46, respectively, provides an air chamber 48 therebetween for insulation of the inner housing 44 from direct heat during a baking operation. The upper end of the outer housing 46 as viewed in FIG. 4 is provided with an outwardly directed circumferential flange 50 extending therearound. The upper end of the inner housing 44 as viewed in FIG. 4 is provided with an outwardly extending circumferential shoulder 52 conterminous with a reversed shoulder 54 which is in spaced relation with respect to the flange 52. The circumferential flange of the outer housing 46 may be interposed between the flange 54 and shoulder 54 for securing the outer housing 46 to the inner housing 44. The assembly 42 may be either loosely disposed in the recess 38 for ready removal therefrom if desired, or the assembly 42 may be rigidly secured in position in any suitable manner such as by soldering or the like (not shown).

In use, the product to be cooked may be deposited in any or all of the cups 34 which are formed by the assemblies 42 and the cooking utensil or muffin tin 32 may be deposited in an oven or other cooking chamber in the usual manner. The direct heat of the shelf (not shown) upon which the cooking utensil 32 is placed will be encountered by the outer housings 46 and the inner housings 44 will be insulated from the direct heat thus greatly facilitating the baking of the contents thereof without inadvertent burning or excessive browning of the outer portions of the food.

Figure 5:
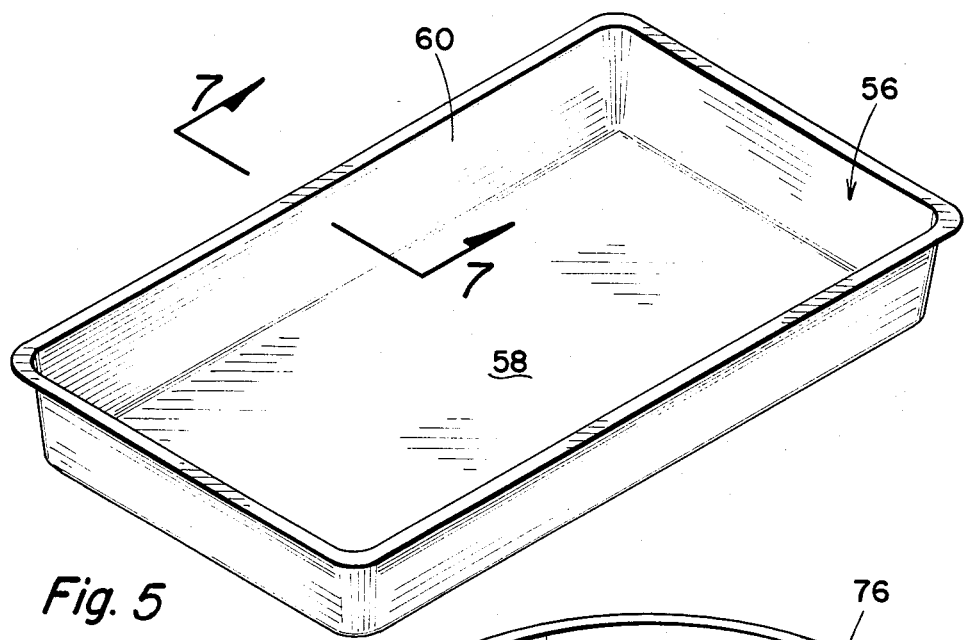
FIG. 5 is a perspective view of a utility type baking pan embodying the invention.
Figure 6:
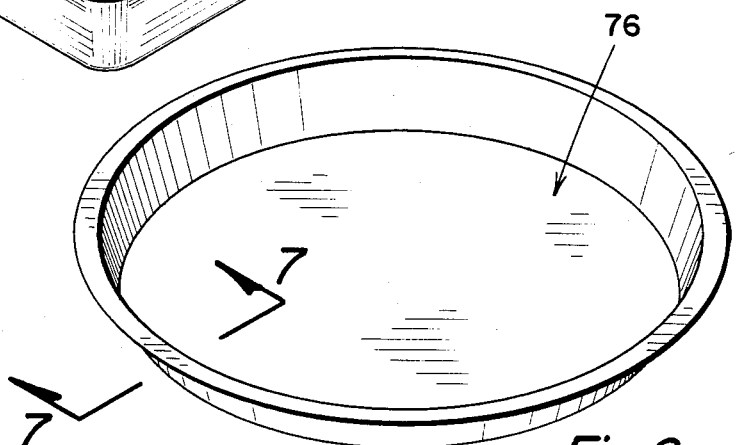
FIG. 6 is a view of a pie tin or cake pan embodying the invention.

Referring to FIG. 5 a utility baking utensil 56 is shown which is preferably of an overall rectangular configuration and comprises a bottom plate 58 having outwardly extending or upstanding sidewalls 60 extending around the outer periphery thereof providing an open inner housing structure. An outer housing structure 62 generally configured corresponding to the configuration of the inner plate 58 and sidewalls 60 is disposed in spaced relationship with respect thereto providing an air chamber 64 therebetween.

Figure 7:
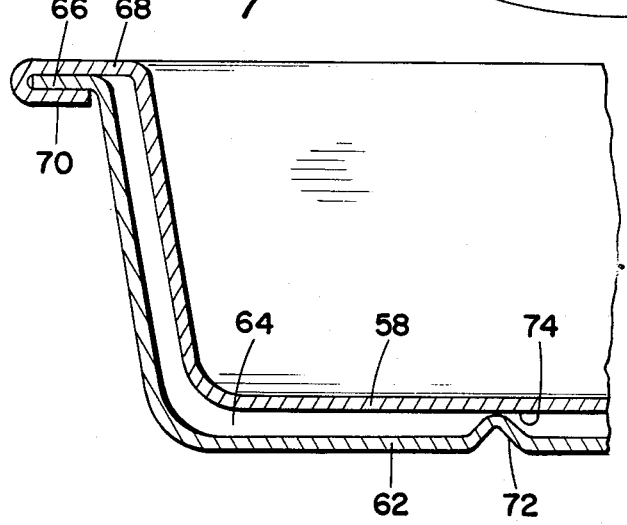
FIG. 7 is a sectional view taken on line 7—7 of both FIGS. 5 and 6.

As shown in FIG. 7 the upper end of the outer housing 62 is provided with a flange 66 extending outwardly around the entire periphery thereof. The upper end of edge of the inner housing 58 is provided with a shoulder or flange 68 extending outwardly from the entire periphery thereof and conterminous with a reversed flange 70. The flange 70 is in spaced relationship with respect to the shoulder 68 for receiving the flange 66 of the outer housing 62 therebetween. In this manner the inner and outer housings may be securely retained in the spaced relationship therebetween. In addition, a plurality of spaced detents 72 are provided in the outer housing 62 and preferably along the lower surface thereof as viewed in the drawings. Each detent 72 extends into engagement with the inner surface 74 of the inner housing 58 and maintains the spaced relationship between the inner and outer housings 58 and 62 respectively. In this manner the spacing between the inner and outer housing 58 and 62 is assured whereby the air pocket or air chamber 64 is maintained for efficiently insulating or protecting the inner housing 58 from the direct heat during a baking operation as hereinbefore set forth.

Reference numeral 76 generally indicates a pie pan, cake pan or the like and is of a dual construction generally similar to the utility pan 56. The pan 76 is preferably of a substantially circular configuration as opposed to the rectangular configuration of the pan 56. The pan 76 may be used for cooking food in the generally similar manner as hereinbefore set forth with the outer housing portion thereof insulating or isolating the inner housing portion thereof from the direct heat in a cooking situation.

Whereas the spacing between the inner and outer walls as shown herein comprises detent means it will be apparent that any suitable means may be interposed between inner and outer walls for maintaining the spaced relationship therebetween such as an expanded metal, wire, screening, or the like. Furthermore, it will be apparent that suitable detents similar to the detents 24 and 72 may be provided in the outer housing 46 of the muffin tin 32, if desired, to assure an efficient and long useful life for the utensil 32.

From the foregoing it will be apparent that the present application provides a novel insulated type cooking utensil having inner and outer housings spaced apart by support means for providing an air chamber therebetween. The air chamber insulates or isolates the inner housing or inner cooking surface from direct heat encountered by the outer housing or outer cooking surface thus greatly facilitating the cooking of food in the utensil in a manner reducing accidental burning or overcooking of the food product.

Whereas the present invention has been described in particular relation to the drawings attached hereto, it should be understood that other and further modifications, apart from those shown or suggested herein, may be made within the spirit and scope of this invention.

What is claimed is:

1. Insulated cooking utensil means comprising first and second cooking surfaces disposed in mutually spaced relationship, an air chamber interposed between the first and second cooking surfaces for insulating one of said surfaces from direct heat during a cooking operation, and means interposed between the first and second cooking surfaces for supporting thereof in said spaced relationship and to maintain said spaced relationship, said last mentioned means comprising a plurality of spaced detents provided in one of the cooking surfaces for engagement with the other of the cooking surfaces whereby the air is maintained in the air chamber at all times during the cooking operation and including peripheral means cooperating between the first and second cooking surfaces for securing said cooking surfaces together in said spaced relationship, the peripheral means including an outwardly extending planar flange member provided around the outer periphery of one of the cooking surfaces, and reverse-bend flange means provided around the outer periphery of the other of the cooking surfaces for permanent, intimate securing engagement with the planar flange member, wherein the first and second cooking surfaces comprise substantially rectangular planar surfaces disposed in substantially mutually parallel relationship.

2. Insulated cooking utensil means as set forth in claim 1 and including angularly disposed flange means extending across at least one edge of the rectangular planar surfaces for facilitating manipulation of the cooking utensil.

* * * * *